United States Patent [19]

Gauthier

[11] Patent Number: 5,155,648
[45] Date of Patent: Oct. 13, 1992

[54] DEVICE FOR PROTECTING A DIRECT CURRENT ELECTRICAL POWER SUPPLY FROM DISTURBANCES CAUSED BY CONNECTING TO IT OR DISCONNECTING FROM IT AN ELECTRONIC SYSTEM

[75] Inventor: Claude Gauthier, Bouville, France

[73] Assignee: Alcatel Cit, Paris, France

[21] Appl. No.: 661,147

[22] Filed: Feb. 27, 1991

[30] Foreign Application Priority Data

Feb. 28, 1990 [FR] France ................ 90 02511

[51] Int. Cl.[5] ........................... H04B 15/02
[52] U.S. Cl. ...................... 361/58; 361/11; 361/18; 361/111; 323/908
[58] Field of Search .............. 361/58, 11, 18, 111; 323/908

[56] References Cited

U.S. PATENT DOCUMENTS 3,912,974 10/1975 Hill ..................... 317/11 C
3,968,421 7/1976 Marquade ................ 323/19
4,658,320 4/1987 Hongel ................... 361/58
4,814,687 3/1989 Walker ................... 323/908
4,891,728 1/1990 Preis et al. ............. 361/18

FOREIGN PATENT DOCUMENTS 2615669 11/1988 France .

OTHER PUBLICATIONS

Linear & Interface Circuits Application, vol. 1; by Pippenger et al., pp. 5-2 column 1, Texas Instruments.
IBM Technical Disclosure Bulletin, vol. 32, No. 2, Jul. 1989, pp. 318-320, Armonk, N.Y., USA; "Method of pre-charging logic card (decoupling) capacitors".

Primary Examiner—Steven L. Stephan
Assistant Examiner—Thomas M. Dougherty
Attorney, Agent, or Firm—Sughrue, Mion, Zinn, Macpeak & Seas

[57] ABSTRACT

A device for protecting a direct current electrical power supply from disturbances caused by connecting to it or disconnecting from it an electronic system comprises at least one variable impedance component. The impedance of this component is controlled so that it has a very high first value when said electronic system is disconnected, a very low second value when said system is connected, a value varying slowly from said first value to said second value on changing from the disconnected state to the connected state and a value varying quickly from said second value to said first value on changing from the connected state to the disconnected state. The output current from said variable impedance component constitutes the supply current of said electronic system.

8 Claims, 2 Drawing Sheets

PROTECTION DEVICES   FILTER CIRCUITS

DEVICE FOR PROTECTING A DIRECT CURRENT ELECTRICAL POWER SUPPLY FROM DISTURBANCES CAUSED BY CONNECTING TO IT OR DISCONNECTING FROM IT AN ELECTRONIC SYSTEM

BACKGROUND OF THE INVENTION

1. Field of the Invention

The present invention concerns a device for protecting a direct current electrical power supply from disturbances caused by connecting to it or disconnecting from it an electronic system.

2. Description of the Related Art

Complex electronic equipment such as telecommunication equipment usually comprises electronic systems such as printed circuit boards equipped with electronic components which plug into subracks mounted in racks or cabinets.

The electrical power required by the electronic components carried by such boards is usually provided by a direct current electrical power supply unit which is shared by the various boards in the same rack.

The supply voltage input circuit of each board usually includes one or more filters to block from the electronic circuits on the board any electrical interference on the supply voltage and to prevent retransmission to the supply of any electrical interference generated when the board is in operation.

A typical filter circuit is shown in FIG. 1; this is an LC filter circuit comprising an inductor L1 and a capacitor C2, the DC supply voltage V being applied to the terminals of the combination L1-C2 and the output voltage being taken across the capacitor C2.

The effectiveness of the filtering action of the circuit is proportional to the values of the inductor L1 and the capacitor C2. However, the values of these components are optimized to allow for other criteria including overall size and cost.

The presence of filters on the board increases the level of electrical disturbances occurring when the boards are plugged in or unplugged, to a degree that is proportional to the current drawn by the board, which is increasingly high because of the increasing trend towards a high concentration of circuits on the board.

When a board having a filter circuit of this kind is connected to the supply, the capacitor C2 is very quickly charged through the inductor L1 which draws a high current from the supply.

The supply is generally a DC/DC converter (for example a 48 V/5 V converter in the case of telecommunication equipment). Although the converter includes a voltage regulator, the time for regulation to become effective is generally long in comparison with the time to charge the capacitor C2 and the result is a temporary drop in the supply voltage while the capacitor is charging, which can disturb the operation of some circuits operating at this time on other boards.

When a board including a filter circuit of this kind is disconnected, the sudden interruption of the current in the inductor belt L1 produces a voltage surge that can in practice have an amplitude of several tens of volts, which causes arcing at the contact of the board connector when the board is disconnected.

During this very short interval (in practice a few microseconds) the voltage surge is transmitted towards the supply and can disturb the operation of some circuits as it gives rise to an electrostatic disturbance which generates electromagnetic disturbance.

One solution to the problems described above occurring when the board is connected is to increase the value of the inductor L1. The time to charge the capacitor C2 would then be increased, enabling the voltage regulator of the DC/DC converter to correct the voltage drop, but the voltage surge on unplugging the board due to the inductor L1 would be of even greater amplitude.

This solution would also lead to an increase in overall size and cost.

Another solution would be to reduce the value of the capacitor C2 or to connect a resistor in series with the capacitor, increasing the impedance presented to the supply and reducing the current drawn from the supply when the board is connected.

This solution would reduce the performance of the filter circuit on the board, however.

An object of the present invention is to avoid these drawbacks, that is to say to avoid the generation of the disturbances described above affecting the common power supply of the boards when boards are connected or disconnected, without compromising the effectiveness of filter circuits on the boards.

SUMMARY OF THE INVENTION

The present invention consists in a device for protecting a direct current electrical power supply from disturbances caused by connecting to it or disconnecting from it an electronic system, said device comprising at least one variable impedance component and means for controlling said impedance so that it has a very high first value when said electronic system is disconnected, a very low second value when said system is connected, a value varying slowly from said first value to said second value on changing from the disconnected state to the connected state and a value varying quickly from said second value to said first value on changing from the connected state to the disconnected state, the output current from said variable impedance component constituting the supply current of said electronic system.

Other objects and characteristics of the present invention will emerge from the following description of one embodiment of the invention given with reference to the accompanying drawings.

DETAILED DESCRIPTION OF THE INVENTION

Figure 1:
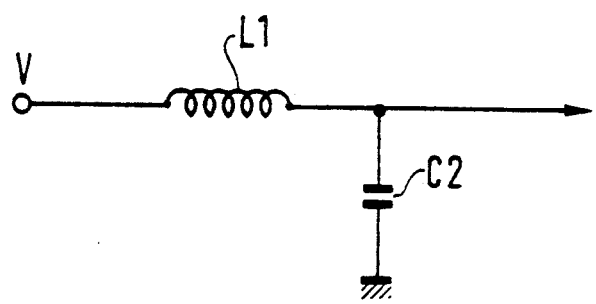
FIG. 1, already described, shows a filter circuit.
Figure 2:
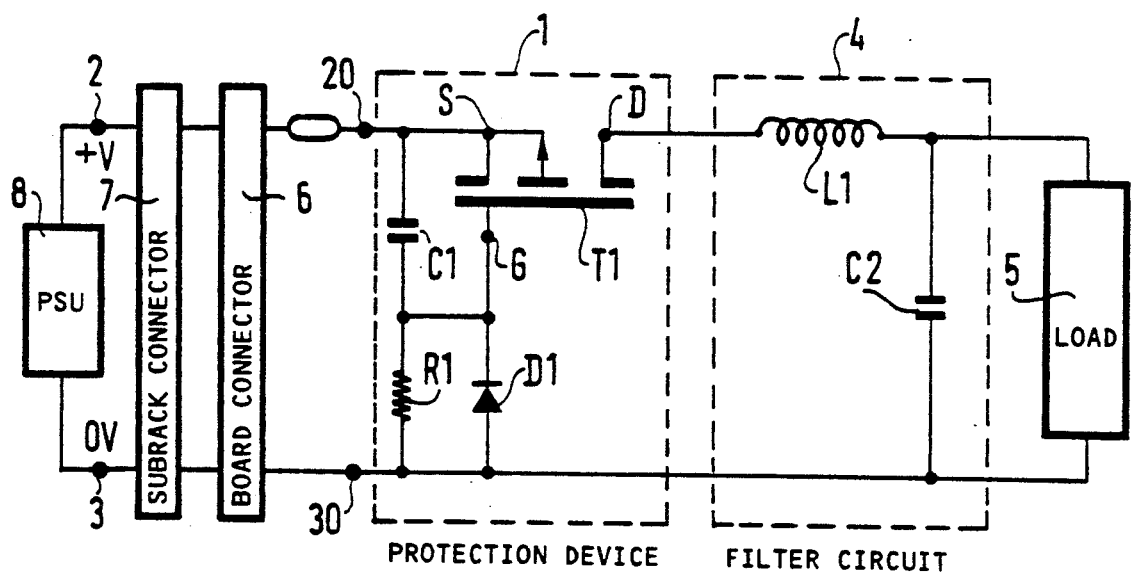
FIG. 2 is a circuit diagram of a first embodiment of protection device in accordance with the invention.

The protection device 1 in accordance with the invention shown in FIG. 2 is connected between terminals 20 and 30 which are connected to respective supply terminals 2 and 3 of an electronic system and the filter circuit 4 of said system.

The electronic system is a printed circuit board which plugs into a subrack in an electronic equipment rack having a direct current electrical power supply common to the various boards in the various subracks.

Between the terminals 20 and 30 and the supply terminals 2 and 3 which are connected to the direct current electrical power supply 8 there are disposed a board connector 6 and a subrack connector 7 into which the board is plugged, the two connectors establishing electrical continuity between the board and the supply terminals 2 and 3 when the board is connected or interrupting this continuity when the board is disconnected.

At the output of the filter circuit 4 is a load 5 representing the circuits of the board other than the protection device 1 and the filter circuit 4.

In the embodiment shown in FIG. 2 a single positive polarity (+V) supply is used, the supply voltage being applied to the supply terminal 2 and the other supply terminal 3 being grounded to the 0 V reference potential.

In FIG. 2 the protection device 1 comprises an integrator in the form of a capacitor C1 and a resistor R1 connected in series and in this order between the terminals 20 and 30 and a P channel MOS power field-effect transistor T1. The input voltage to this circuit, which is the voltage across the series-connected capacitor C1 and resistor R1, is equal to +V when the board is connected or to 0 V when the board is disconnected. The output voltage of the integrator, which is the voltage across the capacitor C1, is the source-gate voltage VSG of the transistor T1 whose source is connected to the terminal 20 and whose gate is connected to the point common to capacitor C1 and resistor R1. The drain current ID of the transistor T1 flows into the filter circuit L1-C2.

A diode D1 is connected between the terminal 30 and the point common to capacitor C1 and resistor R1.

The operation of the protection device will now be described. When the board equipped with the protection device is connected, the input voltage of the integrator R1-C1 suddenly increases from 0 V to +V. The output voltage of the integrator, in other words the source-gate voltage VSG of the transistor T1, increases slowly from 0 V to +V. When a particular value of the voltage VSG is reached, the transistor T1 begins to conduct.

The initially very high (>1 MΩ, for example) drain-source resistance of the transistor T1 is then progressively reduced and the capacitor C2 is therefore progressively charged with a current limited by the value of this resistor.

When the capacitor C1 is fully charged, the transistor T1 is saturated, its drain-source resistance is very low (in the order of 100 mΩ, for example) and the protection device is then "transparent".

For the protection device to be effective, the time for which the charging current of the capacitor C2 is controlled in this way must be very much longer (in the order of 20 ms, for example) than the time to charge the capacitor C2 in the absence of the protection device (in the order of 200 μs, for example), to enable the voltage regulator of the DC/DC converter to operate, in other words in this instance to prevent a temporary drop in the supply voltage +V. The values of the components R1, C1 and T1 are determined accordingly. The drain-source resistance of the transistor T1 when saturated is determined on the basis of the current needed to supply the board when the latter is operating under steady state conditions.

When the board is disconnected, the capacitor C1 is initially charged to the voltage +V and the voltage applied to the side of this capacitor connected to the terminal 20 and therefore to the supply terminal 2 via the connectors 6 and 7 suddenly drops from +V to 0 V, and the potential at its other terminal, connected to the cathode of the diode D1 (the anode of the diode D1 being connected to the supply terminal 3 by the connectors 6 and 7) becomes suddenly negative relative to the 0 V potential. The initially turned off diode D1 is then turned on. The capacitor C1 is therefore discharged very quickly through the diode at the same time as the source-gate voltage VSG of the transistor T1 decreases very rapidly, turning off transistor T1. This occurs very quickly (in practise within a few nanoseconds) and prevents any disturbance in the drain circuit due in particular to the presence of the filter L1-C2 being transmitted to the source circuit of the transistor T1, in other words to the direct current electrical power supply.

Figure 3:
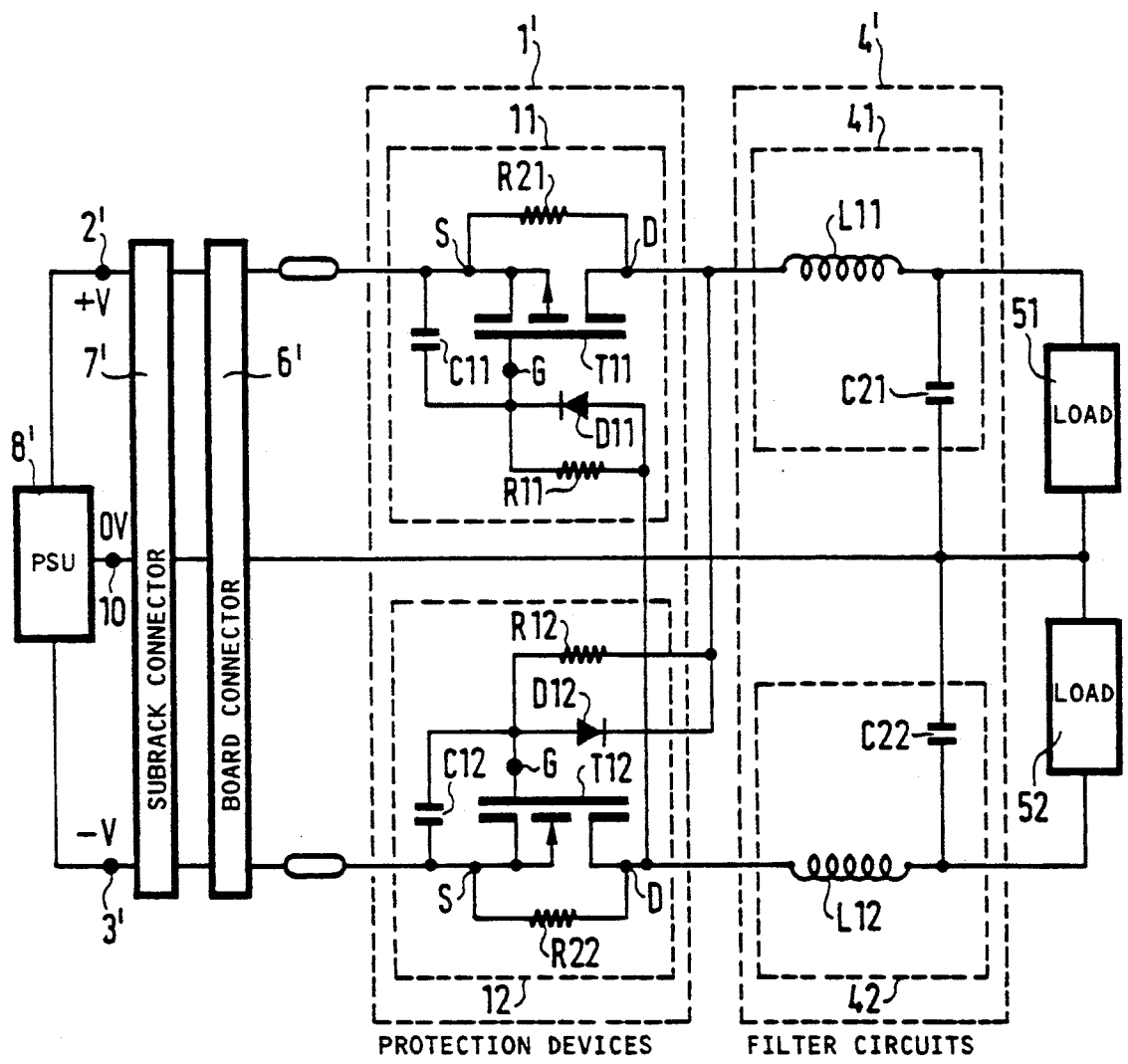
FIG. 3 is a circuit diagram of a second embodiment of protection device in accordance with the invention.

The embodiment of the protection device 1' in accordance with the invention shown in FIG. 3 is for a board with a positive supply +V and a negative supply −V at respective supply terminals 2' and 3', the 0 V reference potential being connected to a supply terminal 10. The power supply 8' provides the two voltages +V and −V and is connected to the supply terminals 2', 3' and 10.

The filter circuit 4' then comprises a separate filter circuit 41 and 42 for each of the two voltages. Here each circuit is similar to the circuit 4 from FIG. 2 and therefore comprises a respective inductor and capacitor L11 and C21, L12 and C22. The output of the circuits 41 and 42 are connected to respective loads 51 and 52 representing the circuits of the board supplied with power via the protection device 1' and the respective filter circuits 41 and 42.

The protection device 1, is connected to the supply terminals 2', 3' and 10 by a board connector 6' and a subrack connector 7'. It comprises two separate devices 11 and 12 each comprising, like the protection device 1 from FIG. 2, a power field-effect transistor T11, an integrator R11-C11 and a diode D11 in the case of the first device 11, and a power field-effect transistor T12, an integrator R12-C12 and a diode D12 in the case of the second device 12, subject to the following differences:

The transistor T11 of the device 11 is like the transistor T1 of the device from FIG. 2 a P channel MOS transistor with its source connected through the connectors 6' and 7' to the supply terminal 2' at the positive potential +V (and its drain connected to the input terminal of the filter circuit 41 connected to the inductor L11). However, the transistor T12 of the device 12 is an N channel MOS transistor and its source is connected by the connectors 6' and 7' to the supply terminal 3' at the negative potential −V (and its drain is connected to the input terminal of the filter circuit 42 connected to the inductor L12).

The point common to the resistor R11 and the anode of the diode D11 is connected to the drain D of the transistor T12, and the point common to the resistor R12 and the cathode of the diode D12 is connected to the drain D of the transistor T11. As a result, when the board with its protection device is disconnected the diodes D11 and D12 are turned on more quickly, so that the transistors T11 and T12 are turned off more quickly, than in the FIG. 2 circuit.

A resistor R21 is connected between the source S and the drain D of the transistor T11. A resistor R22 is connected between the source S and the drain D of the transistor T12. When the board with this protection device is connected (in other words, starting from an initial state in which the transistors T11 and T12 are turned off), this provides a circuit for charging the capacitor C11 through the resistor R11 and the resistor R22 and a circuit for charging the capacitor C12 through the resistor R12 and the resistor R21.

To avoid reducing the performance of the system, the resistors R21 and R22 must have a high value, in the order of 1 MΩ, for example.

The invention has been described in the context of an application to a printed circuit board which plugs into a subrack of an electronic equipment rack but it is obvious that the invention is not limited to this application. It can be applied to any electronic system of a group of electronic systems supplied with power by a common direct current electrical power supply which is to be individually connected to and disconnected from said supply, to avoid the generation, on connecting or disconnecting said systems, of disturbances on the common supply and therefore on the supply to other systems of the group connected at this time to the supply.

Although the protection device in accordance with the invention is particularly effective in the case of individual supply filter circuits in the various electronic systems, the invention retains its utility in the absence of such individual filter circuits, in particular for preventing any drop in the supply voltage provided by the common power supply to said system upon connecting any system.

There is claimed:

1. Device for protecting a direct current electrical power supply from disturbances caused by connecting to it or disconnecting from it an electronic system, said device comprising at least one variable impedance component and means for controlling said impedance so that it has a very high first value when said electronic system is disconnected, a very low second value when said system is connected, a value varying slowly from said first value to said second value on changing from the disconnected state to the connected state and a value varying quickly from said second value to said first value on changing from the connected state to the disconnected state, the output current from said variable impedance component constituting the supply current of said electronic system.

2. Device according to claim 1 wherein said variable impedance component comprises a field-effect power transistor whose source-gate voltage is provided by said control means and whose drain current constitutes the supply current of said electronic system.

3. Device according to claim 1 wherein said control means comprise an RC integrator powered by the supply voltage delivered by said supply when said electronic system is connected and not powered when said system is disconnected, and a diode for discharging the capacitor of said RC integrator when said electronic system changes from the connected state to the disconnected state.

4. Device for protecting a direct current electrical power supply from disturbances caused by connecting to it or disconnecting from it an electronic system, said electrical power supply being adapted to produce two voltages of opposite polarity, said device comprising for each polarity a respective variable impedance component and means for controlling said impedance so that it has a very high first value when said electronic system is disconnected, a very low second value when said system is connected, a value varying slowly from said first value to said second value on changing from the disconnected state to the connected state and a value varying quickly from said second value to said first value on changing from the connected state to the disconnected state, the output current from said variable impedance component constituting the supply current of said electronic system.

5. Device according to claim 4 wherein each variable impedance component comprises a field-effect power transistor whose source-gate voltage is provided by said control means and whose drain current constitutes the supply current of said electronic system.

6. Device according to claim 4 wherein each control means comprise an RC integrator powered by the supply voltage delivered by said supply when said electronic system is connected and not powered when said system is disconnected, and a diode for discharging the capacitor of said integrator when said electronic system changes from the connected state to the disconnected state.

7. Device according to claim 6 wherein for each polarity the respective diode for discharging the respective capacitor of the respective integrator is connected to one side of said capacitor and to the output of said variable impedance component associated with the other polarity.

8. Device according to claim 6 wherein the respective integrator for each polarity further comprises a high-value resistor connected in parallel with the variable impedance component associated with the other polarity.

* * * * *